J. F. BOORAEM & G. E. ROHMER.
ANCHORAGE DEVICE.
APPLICATION FILED MAR. 10, 1911.
1,120,367.
Patented Dec. 8, 1914.
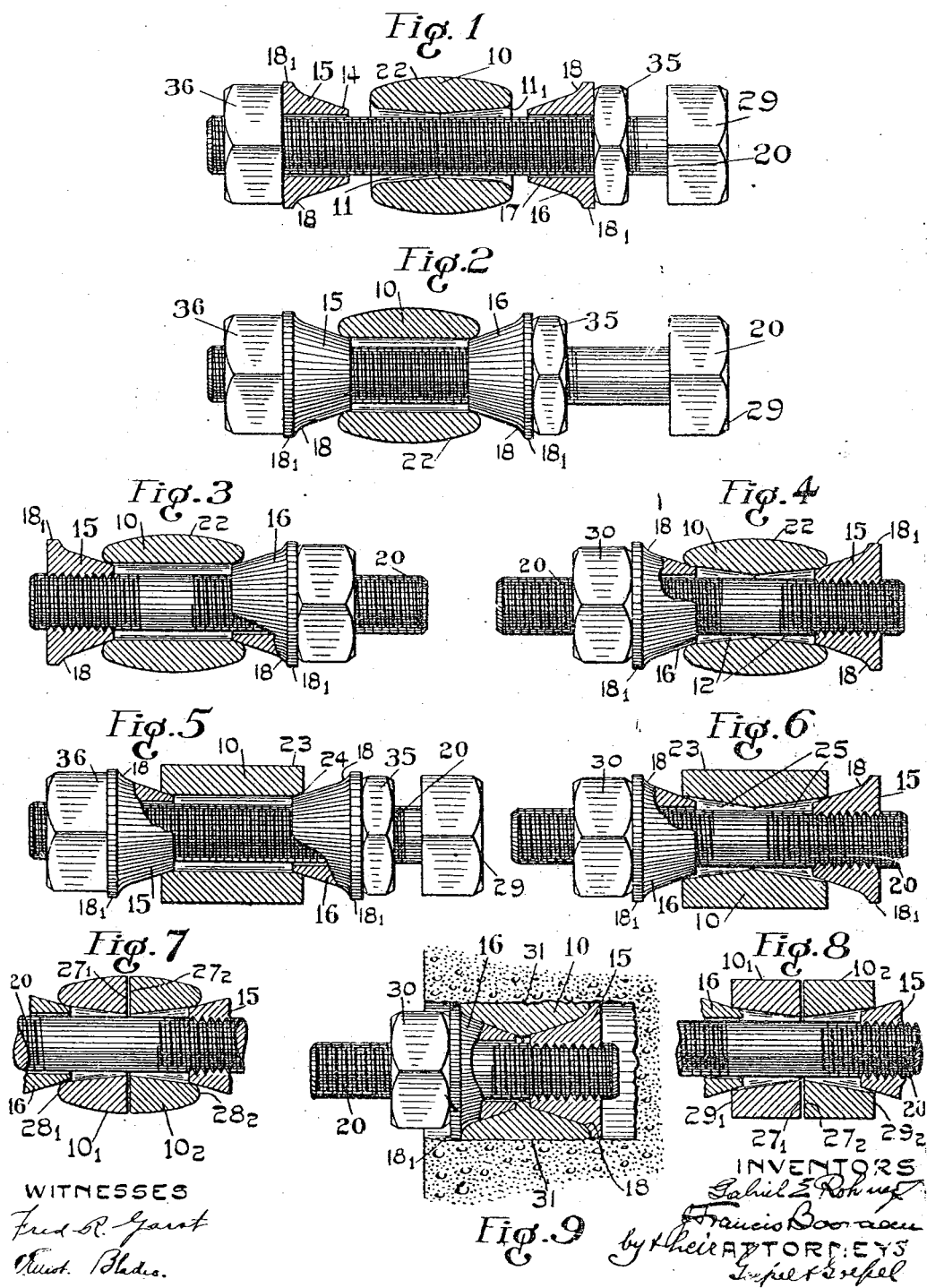

UNITED STATES PATENT OFFICE.

JOHN FRANCIS BOORAEM, OF GREENWICH, CONNECTICUT, AND GABRIEL E. ROHMER, OF WOODSIDE, NEW YORK, ASSIGNORS, BY MESNE ASSIGNMENTS, TO CINCH EXPANSION BOLT & ENGINEERING COMPANY, OF NEW YORK, N. Y., A CORPORATION OF NEW YORK.

ANCHORAGE DEVICE.

1,120,367.   Specification of Letters Patent.   Patented Dec. 8, 1914.

Application filed March 10, 1911. Serial No. 613,627.

*To all whom it may concern:*

Be it known that we, JOHN FRANCIS BOORAEM, a citizen of the United States of America, and residing in Greenwich, in the county of Fairfield and State of Connecticut, and GABRIEL E. ROHMER, a citizen of the United States of America, and residing in Woodside, in the county of Queens and State of New York, have invented certain new and useful Improvements in Anchorage Devices, of which the following is a specification.

This invention relates to anchorage devices and has for its object to provide an improved means of anchorage.

The invention is shown in the accompanying drawing and will be more fully described hereinafter, and finally pointed out in the claims.

In the accompanying drawing, Figures 1 to 8 show vertical, longitudinal sections partly in elevation of embodiments of our improved device, in which Fig. 1 shows the expansible member arranged with a tapering bore, Fig. 2 shows the expansible member with a cylindrical bore, Fig. 3 shows one expanding member screw-threaded to a stud bolt, and the expansible member with a cylindrical unthreaded interior and rounded exterior, the other expanding member fitting unthreaded on the bolt, Fig. 4 also shows an expanding member screw-threaded to a stud bolt with an expansible member having a tapering bore, Fig. 5 shows an expansible member having a rectangular shape in longitudinal section, Fig. 6 shows an expansible member having a rectangular shape in longitudinal section, and a tapering bore at its interior with one expanding member screw-threaded on the stud bolt, Fig. 7 shows the expansible member shown in Fig. 1 divided into two parts meeting back to back, having a rounded exterior and a tapering bore, Fig. 8 shows a similar arrangement with an expansible member arranged to have an exterior rectangular shape in longitudinal section, with a tapering bore interior, and Fig. 9 shows one form of our device as applied to a hole of concrete or similar material.

Similar letters of reference indicate corresponding parts throughout the several figures of the drawings.

Referring to the drawings, the expansible member 10 fits loosely on the bolt 20 which is screw-threaded and which has a head 29 at one end. Meshing with the screw-threads on the bolt 20 are nuts 35 and 36, the nut 35 acting as a check because it is at the end of the thread on the bolt, which nut may be replaced by any other abutment or by the work to be anchored. The other nut 36 on the continued turning of the threaded end of the bolt advances on the same. Intermediate the nuts 35 and 36 of the embodiment shown in the drawings, expanding cone-shaped members 15 and 16 are arranged, which have an interior bore of substantially the same diameter as the diameter of the bolt. The exterior is shaped with a straight part terminating in a fillet 18 behind which a cylindrical collar $18^1$ is arranged. In the embodiment shown in the drawings, the exterior is shaped longitudinally to a curve of substantially the shape of a catenary. One end of the expanding member has a diameter slightly larger than that of the bolt, while the other end has a diameter substantially equal to or somewhat smaller than the hole into which it is to be used. Parts of the expanding cone-shaped members 15 and 16 rest against nuts 35 and 36.

Intermediate the expanding members 15 and 16 which are of relatively hard material, as malleable or cast iron or steel, an expansible member 10 is arranged, which is of soft lead or alloy, or other suitable material, which is semi-plastic under pressure, so as to be expansible and capable of molding. In Fig. 1, this member 10 is provided with a tapering bore 11 and has a rounded perimeter $11^1$.

In the form shown in Fig. 2 the expansible member is provided with a cylindrical interior and a curved exterior.

In Fig. 3, the expanding member 15 is shown screw-threaded so as to engage the stud bolt 20, and the expansible member is shown with a cylindrical interior and a curved exterior.

In Fig. 4 one expanding member 15 is shown screw-threaded and the expansible member is shown with a tapering bore as at 12 and with a curved off exterior as at 22, while the following nut is shown by 30.

In Fig. 5, the expanding member is shown in longitudinal section with an exterior wall 23 and an interior wall 24, the expanding members 15 and 16 engaging the interior of the expansible member 10.

In Fig. 6, the expansible member is shown in longitudinal section with an exterior wall 23 and with a tapering bore 25, the expanding member 15 being screw-threaded to co-act with the stud bolt.

In Fig. 7, the expansible member is divided into two parts $10^1$ and $10^2$ which have their backs $27^1$ and $27^2$ face to face, having rounded off ends $28^1$ and $28^2$, and similarly, in Fig. 8 the expansible member is shown in two parts $10^1$ and $10^2$ with exterior surfaces $29^1$ and $29^2$ at the free ends and their parts $27^1$ and $27^2$ back to back. In Fig. 7, the expansible member has a tapering bore and a rounded interior and in Fig. 8 the expansible member is shown with a tapering bore.

The expansible member may have various cross sections, one of which may be rectangular.

The operation of our improved device is as follows: With the parts in the position shown in Fig. 1, and the expanding members facing each other, and the expansible member 10 therebetween, or back to back as shown in Fig. 7, the bolt is turned, the nut 35 being prevented from turning by suitable means, as a wrench, whereupon the expanding members are brought toward each other until they enter each free end of the expansible member. The turning of the bolt is continued and thereby the free ends of each expansible member are forced radially outwardly and simultaneously longitudinally toward the center of the expansible member. By this the exterior peripheral surface of the expansible member is brought, throughout its surface into intimate contact with the walls of the hole, filling all interstices of the material as shown at 31 in Fig. 9. The turning is continued until all available space between the operative surface of the expanding members and the walls of the hole are so filled that no further relative motion of the expanding members or bolt can take place, the filleted flange 18 which is substantially the diameter of the hole, acting as a stop to the flow of the mass of material of which the expansible member is composed. The mass of the expansible member by a further slight turning is compactly compressed between the expanding members and the walls of the holes and finding complete resistance against the expanding members with the filleted flanges is forced back against the walls of the holes and to the threaded bolt if any space exists between the inner ends of the expanding members.

The exterior of the expansible member contacting with the walls of the hole forming a surface contact throughout its circumference and length, represents a very large area of contact in intimate relation under continuous pressure, which is maintained by the position of the expanding members, so that in effect, the bolt, expanding members, expansible members, and walls of the hole, act as if they were one uniform, homogeneous mass.

Reference is hereby made to our co-pending application filed by us on April 24, 1911, Serial No. 623,073, in which a method is described and claimed, whereas the structure is described and claimed in this application, the said method consisting in expanding and molding an expansible member under complete restraint, so that all the expanding material is forced into the interstices of the walls of the hole and against said walls, without leakage, and the expansible member is anchored to the said walls, which is claimed in that application but is not claimed herein.

We have shown several embodiments of our invention, but we do not wish to be limited to the specific forms thereof, since changes within the scope of the appended claims may be made therein, without departing from the spirit and underlying principles of our invention.

Having thus described our invention, we claim as new and desire to secure by Letters Patent:

1. In an expansion bolt, the combination of a bolt, an expansible member capable of being molded under pressure, an expanding member at each end of the expansible member, and a collar at the outer end of each of the expanding members and of larger diameter than the expanding members.

2. In an expansion bolt, the combination of a bolt, an expansible member capable of being molded under pressure, an expanding member at each end of the expansible member, the contacting surfaces of the expanding and expansible members having different inclinations with respect to the axes of the bolt, said expanding members being adapted to act consecutively on different portions of the expansible member, whereby the entire force causing expansion is successively concentrated upon consecutive portions of the expansible member, and a collar at the outer end of each of the expanding members and of larger diameter than the expanding members.

3. In an expansion bolt, the combination of an expansible member of a material capable of being molded and mounted on said bolt, said expansible member having an outer surface of varying distance from the periphery of the bolt, and members for expanding said expansible member, entering both ends thereof, the diameter of the entering ends of said members being equal to the diameter of the entered ends of said expansible member.

4. In an expansion bolt, the combination of a bolt proper, an expansible member of a material capable of being molded and mounted on said bolt proper, said expansible member having an outer surface of varying distance from the periphery of the bolt proper, expanding members entering each end of the expansible member and being adapted to act consecutively on different portions of the expansible member, whereby the entire force causing expansion is concentrated on consecutive portions of the expansible member, and a collar at the outer end of each of the expanding members and of larger diameter than the expanding members, the volume of the expansible member between the expanding members and the collars being such as to cause the expansible member to be forced outwardly against the walls of the hole as the expanding members enter the ends thereof.

5. The combination of an expansible member of semi-plastic material capable of being molded, and an expanding member of relatively hard material, engaging the expansible member, and having a filleted flange at its end away from that end engaging the expansible member.

6. The combination of an expansible member of semi-plastic material capable of being molded, and an expanding member for engaging the same, said expanding member being shaped longitudinally like a catenary curve, and formed of a straight part terminating in a fillet, and a cylindrical collar arranged at that end of the expanding member opposite to that end engaging the expansible member.

7. In an expansion bolt, the combination of a bolt, expanding members thereon, each having a beveled end and having these beveled ends facing each other, and an expansible member of a material capable of being molded under pressure, having a bore at each end thereof engaged by the beveled end of the expanding members, the diameter of the bore being equal to the diameter of the entering end of the expanding member.

In testimony, that we claim the foregoing as our invention, we have signed our names in presence of two subscribing witnesses.

J. FRANCIS BOORAEM.
GABRIEL E. ROHMER.

Witnesses:
JAMES T. LEE,
JACOB FRIEDMAN.